United States Patent [19]

Palinkas et al.

[11] Patent Number: 4,832,098
[45] Date of Patent: May 23, 1989

[54] NON-PNEUMATIC TIRE WITH SUPPORTING AND CUSHIONING MEMBERS

[75] Inventors: Richard L. Palinkas, Northfield; Gilles J. Page, Enfield, both of Conn.

[73] Assignee: The Uniroyal Goodrich Tire Company, Akron, Ohio

[21] Appl. No.: 190,299

[22] Filed: May 4, 1988

Related U.S. Application Data

[63] Continuation-in-part of Ser. No. 787,867, Oct. 16, 1985, abandoned, which is a continuation-in-part of Ser. No. 600,932, Apr. 16, 1984, abandoned.

[51] Int. Cl.$^4$ ............................................. B60C 7/00
[52] U.S. Cl. .................................... 152/7; 152/11; 152/323; 301/63 PW
[58] Field of Search ............... 301/63 PN; 152/5, 7, 152/11, 12, 323, 324, 325, 326, 327, 328, 256

[56] References Cited

U.S. PATENT DOCUMENTS

| | | | |
|---|---|---|---|
| 1,258,573 | 3/1918 | Johnstone | 152/326 X |
| 1,441,654 | 1/1923 | Austin . | |
| 1,494,797 | 5/1924 | Nimschke | 152/328 X |
| 1,590,982 | 7/1926 | Kirkwood | 152/326 |
| 1,617,870 | 2/1927 | Snider | 152/326 |
| 2,603,267 | 11/1949 | Simposn . | |
| 2,620,845 | 12/1952 | Lord | 152/328 |
| 2,742,941 | 4/1956 | Johnson | 152/326 |
| 3,188,775 | 6/1965 | Cosmos | 152/7 |
| 3,219,090 | 11/1965 | Cislo | 152/7 |
| 3,311,149 | 3/1967 | Mathiesen | 152/7 |
| 3,470,933 | 10/1969 | Molnar | 152/320 |
| 3,870,372 | 3/1975 | Knipp | 301/63 PW |
| 3,888,545 | 6/1975 | Braun | 301/63 PW |
| 3,901,300 | 8/1975 | Toplis | 152/256 |
| 3,907,370 | 9/1975 | Bard | 301/63 PW X |
| 4,071,070 | 1/1978 | Schmidt | 152/333 |
| 4,168,771 | 9/1979 | Krivec | 152/326 X |
| 4,169,494 | 10/1979 | Kubica et al. | 152/310 |
| 4,226,273 | 10/1980 | Long et al. | 152/326 |
| 4,235,270 | 11/1980 | Kahaner et al. | 152/7 |
| 4,287,927 | 9/1981 | Caravito et al. | 152/302 |
| 4,345,633 | 8/1982 | Gilmore | 152/328 |
| 4,553,577 | 11/1985 | Gregg | 152/12 |
| 4,762,739 | 8/1988 | Kraus | 301/63 PW X |

FOREIGN PATENT DOCUMENTS

| | | | |
|---|---|---|---|
| 2460051 | 7/1976 | Fed. Rep. of Germany | 152/325 |
| 1278131 | 10/1961 | France | 152/7 |
| 1726 | of 1915 | United Kingdom | 152/323 |
| 601764 | 5/1948 | United Kingdom | 152/325 |

Primary Examiner—Robert B. Reeves
Assistant Examiner—Russell D. Stormer
Attorney, Agent, or Firm—Alfred D. Lobo; Alan A. Csontos

[57] ABSTRACT

A non-pneumatic tire ("NPT") is integrally molded from a stiff, resilient elastomeric material with particular specifications, to form a unitary structure comprising outer and inner cylindrical coaxial and coextensive members ("hoops"). The outer hoop is supported and cushioned by a plurality of circumferentially spaced apart, planar rib members (ribs) and a planar central web member (web) which connects the hoops at their circumferential center lines. The web lies in a plane perpendicular to the rotational axis of the NPT. The ribs extend axially along the inner and outer hoops, connecting them, and the edges of the ribs lie along the opposite faces of the web. The ribs are angulated in the range from 15° to 75° to radial planes which intersect them at their radially inner ends. A rubber tread is secured to the outer surface of the outer hoop. The coaction of the structural elements of the NPT provide a load-supporting structure which, in operation, is subjected to continuous compression and tensile forces as it travels over the ground. Its deformation and buckling characteristics which are derived from the unique interaction of the structural elements provide the NPT with "ride" and "handling" characteristics surprisingly similar to those of a conventional pneumatic tire.

10 Claims, 5 Drawing Sheets

RADIAL DEFLECTION (Inches)

TIRE LOAD (Lbs.)

NON-PNEUMATIC TIRE WITH SUPPORTING AND CUSHIONING MEMBERS

BACKGROUND OF THE INVENTION

This application is a continuation-in-part application of Ser. No. 787,867 filed on Oct. 16, 1985, which is a continuation-in-part application of Ser. No. 600,932 filed on Apr. 16, 1984, both now abandoned and each of which is incorporated by reference thereto as if fully set forth herein.

This invention relates to a load-bearing non-pneumatic tire ("NPT" for brevity) having angularly oriented oppositely directed planar rib members (referred to as "crossed ribs") integrally connected by a planar central web which makes the NPT non-expansible. By "non-expansible" we refer to the diameter of a wheel fitted with a NPT, which diameter does not get larger when the wheel is rotated, due to the centrifugal forces generated during operation.

The NPT is so configured from an elastomeric synthetic resinous material having specified desirable properties, as to allow the NPT to be deformed due to compression and revert to its original cylindrical shape while carrying its share of a load, typically as a tire mounted on a wheel rim of an automobile or a motorcycle. By "elastomeric synthetic resinous material" or "elastomer" we refer to a stiff, resilient, material having specific characteristics defined hereinafter. Rubber, whether natural or synthetic (particularly, styrene-butadiene rubber, SBR), and blends thereof, no matter how blended or vulcanized, is not an elastomer as defined herein, as it fails to meet the criteria set forth herebelow.

The unique coaction of the structural elements of the NPT provide it with deformation and load-bearing characteristics which belie the stiffness of the elastomeric material and the total lack of air trapped within it. But the unique open construction of the NPT dissipates the heat generated during continuous cycling between alternating compressive and tensile forces in play during operation. Though the NPT is non-expansible it provides a high degree of comfort when used on a passenger automobile. The degree of comfort is unexpectedly similar to that obtained with many conventional pneumatic tires. The NPT is ideal for a wide spectrum of wheeled vehicles in which (i) the relatively smaller space occupied by the NPT is desirable, (ii) the susceptibility to puncture is obviated, and (iii) failure of the NPT on special-purpose vehicles such as a personnel carrier due to sudden and serious damage, as for example a bullet, is progressive, failing gradually rather than suddenly, and the effect of such damage is thus minimized.

The overriding advantage of a pneumatic tire is the cushioning it provides which, to date, as far as we know, has not been effectively mimiced. We know of no other construction for an elastomeric NPT which is reliable and rugged enough to withstand the rigors of normal operation when mounted on the wheel of an automobile.

The main disadvantage of the pneumatic tire is that, after being punctured, a deflated tire cannot be "run flat" without damaging the tire. To minimize the damage upon being punctured, cushioning devices have been inserted in pneumatic tires, but with only marginal success over only a limited time, because of the heat generated between the cushioning device and the deflated tire. Tires with compartmentalized interiors cannot dissipate the heat generated during operation.

As will readily be realized, NPTs have been routinely used on vehicles where cushioning the load is not a prime consideration, as for example in fork lift trucks, carts, wheelbarrows, tricycyles, and the like. Even so, the use of NPTs in such applications was less than satisfactory because prior art NPTs had undesirable handling characteristics, a term used to define the general unresponsiveness of the NPT-equipped vehicle to the expectations of the driver. In addition, one could not provide a variable spring rate in a prior art NPT without changing either its design, that is, its structural configuration, or the materials of its construction. Solid tires, in particular those made from vulcanized rubber, were subject to high heat buildup and subsequent degradation after only constricted usage over a severely limited period. No prior art NPT that we know of suggests an integral NPT with a planar central web and crossed ribs which are able to deform locally, that is, near the point where the NPT contacts the surface on which it is run, yet discharges its load-bearing and cushioning functions in a manner analogous to that in which a pneumatic tire discharges such functions.

Figure 1:
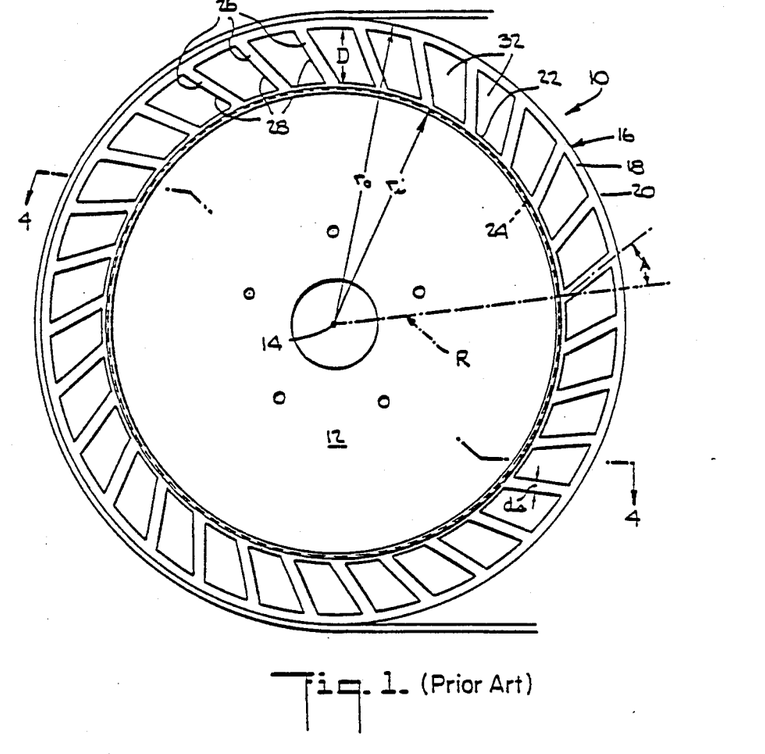
FIG. 1 is a side elevation view of a prior art wheel over which a grinding belt is trained, the wheel having a central metal portion (corresponding to a "rim" of a vehicle's wheel) and, an elastomeric annular body portion (corresponding to a "tire") having angularly inclined rib elements, all inclined from radial planes through the wheel, and in the same direction, so that the diameter of the wheel expands due to centrifugal force generated when the wheel is rotated.

In U.S. Pat. No. 3,188,775 to Cosmos there is disclosed a rubber wheel, he refers to as an expansible sleeve holder, over which an abrasive belt is trained. The wheel is provided with an expansible structure having circumferentially spaced-apart webs in planes at an angle to that passing through the axis of rotation of the wheel, the webs extending radially in a common direction. The angulated webs in the Cosmos wheel, viewed as rib members (ribs), are connected by a planar central web illustrated in the drawing (FIG. 2 of the '775 patent) but not otherwise referred to because the web is an incident of the manner in which the wheel is molded. The ribs provide a specific function, namely to permit the peripheral rim of the wheel to expand due to centrifugal force under which the normally concave ('dished') circumferential surface of the wheel becomes a cylindrical surface.

The web shown cross-hatched in the drawing of the Cosmos wheel, but not referred to in the specification, is the "flash" of thin (about 1 mil) membranous rubber which is inevitably formed when the wheel is molded under compressive force, as described in his specification. The Cosmos wheel is commercially available from the Cosmos Wheel & Roll Div. of Chicago Rubber Co. as the "Cosmo" wheel. The flash has no structural function in the Cosmos wheel. If the flash between the ribs was deliberately thick ('heavy'), a large portion of the rubber would escape from the Cosmos mold near the circumference of the peripheral rim, at the parting line of the upper and lower molds, since there is no evidence that the mold is designed to form a heavy web. More important, if the flash was heavy, the expansion of the peripheral rim would be counteracted. Besides being at cross-purposes to the stated function of his wheel, there is clearly no suggestion that some provision could or should be made for deliberately molding flash into the wheel to provide any structural function. Equally clearly, angulation of the ribs in a common direction is dictated by the requirement for expansion of the wheel's dished rim, rather than any thought of providing a load-bearing wheel able to support the load carried by an axle inserted in the hub of the wheel. A pair of spaced apart rigid circular plates is specifically provided to provide a large bonding surface for the rubber therebetween since, under the tremendous centrifugal forces developed during use of the wheel at speeds in excess of 1500 rpm, the annular body portion of the wheel would not survive the centrifugal forces to be generated. Further details relating to the Cosmos wheel are referred to in FIG. 1 described herebelow in connection with the appended drawing, and the illustrative examples in which modifications of the Cosmos wheel were made.

From the foregoing factual considerations relating to the function of the structural elements in the Cosmos wheel, and their interaction, it is clear that the nature of the problem, the solution of which he sought, was not just different, but unrelated. It is quite evident that the nature of the problem confronting us, namely to provide a load-bearing wheel for a wheeled vehicle, was unrelated to the nature of the problem which confronted Cosmos, and though there are certain similarities in the structures, it would be unrealistic to expect persons of ordinary skill in the tire art to consult references on wheels for supporting a sleeve of abrasive material, in developing an improved NPT.

The effectiveness of the unique structural configuration of our NPT will be particularly appreciated when compared, for example, with that of the NPT disclosed in U.S. Pat. No. 1,258,573 to Johnstone in whose NPT there are radial webs, diagonal webs and intersecting webs, but no ribs. The load is carried by disks which extend on either side of the center portion of the tire; the center portion is formed by spokes, integral with the hub, extending to the periphery of the tread portion. The load is distributed laterally by the criss-cross webbing between adjacent spokes. If some of the webs are considered as ribs, there is no circumferential web, and such rib structure, irrespective of which ribs are considered, does not have the necessary configuration to provide the function of our NPT.

The earlier concept embodied in Johnstone's compartmentalized tire was improved in U.S. Pat. No. 1,494,797 to Nimschke which embodiied a multiplicity of individually replaceable sections having configured void spaces ("compartments") distributed over the periphery of the tire, and because air was trapped in them, the tire provided the desired cushioning. The tire was a simple grid of rubber with radially extending web sections and circumferentially extending rib members which connect the web sections to give them rigidity. Ignoring the lack of any provision to dissipate heat during operation, the compartmentalized tire lacked the concept of providing an interaction of oppositely directed rib members which must directly connect not only the web members, but the inner and outer cylindrical members of the tire.

The open construction of our NPT not only serves to cool it during operation, but permits an economy of high-priced elastomer. Of course, numerous prior art configurations of tires have sought to economize on material, as for example, illustrated in U.S. Pat. Nos. 1,441,654 and 1,493,923 to Austin, and Deister respectively, without providing the operational characteristics of our NPT.

The concept of providing a central planar web in a solid rubber tire is also old, having been taught in German Offenlegungsschrift No. 24 60 051. For additional strength, the upper and lower flanges of the I-beam-like member are connected with interdigitated sinusoidal scallops along its inner surface. This manner of strengthening the structure is quite different from the oppositely directed ribs on either side of the web of the NPT. This reference, and all prior art references failed to recognize the peculiar function of planar oppositely directed angulated ribs which are undercut to help ensure that bending is negated, so that, instead of bending, they will buckle when the critical load is exceeded. It is this peculiar characteristic of compressive deformation of the NPT in normal use, coupled with buckling of the ribs when the critical load is exceeded, which is instrumental in giving the NPT 'ride' and 'handling' characteristics which mimic those of a conventional pneumatic tire.

SUMMARY OF THE INVENTION

It has been discovered that a specific configuration of oppositely directed ribs, extending at an angle from 15° to 75° to radial planes which intersect the ribs at their inner ends, from the inner cylindrical member ("inner hoop") to the outer cylindrical member ("outer hoop") of a non-pneumatic tire ("NPT"), and a single circumferential central planar web member ("web") having its inner and outer peripheries connected respectively to said inner and outer hoops, all integrally formed as an unitary construction from a stiff, resilient elastomeric material, form a unique load-carrying structure which is non-expansible during operation, yet continuously deformable at the point of contact with the road as the NPT rotates, so that the NPT functions surprisingly like a pneumatic tire without its disadvantages.

It is therefore a general object of this invention to provide a NPT having a unique arrangement of oppositely directed ribs on either side of a single central planar web (in a plane perpendicular to the axis of rotation of the tire) between inner and outer cylindrical hoops, all molded from a cured elastomeric resin having specified properties, which arrangement results in a non-expansible annular body imbued with surprisingly similar 'ride' and handling characteristics compared to those of a conventional pneumatic tire, including a capability of carrying a load of at least 226 kg (500 lbs), when mounted on the wheel of a vehicle operating at speeds up to 128 km/hr (80 miles/hr) for thousands of miles, without being much the worse for wear.

It is a specific object of this invention to provide a NPT with an "open" or non-compartmentalized structure incapable of trapping air (which normally provides a cushioning function), and through which structure air circulates freely while the NPT is in operation, to keep the structure cool.

BRIEF DESCRIPTION OF THE DRAWINGS

The foregoing and other objects and advantages of our invention will appear more fully from the following description, made in connection with the accompanying drawings of preferred embodiments of the inventions, wherein like characters refer to the same or similar parts throughout the views, and in which.

DETAILED DESCRIPTION OF PREFERRED EMBODIMENTS

It will be evident that the structural details of the NPT are necessarily tied to its functional characteristics during operation, and these in turn are derived from the materials of choice. Though it may be theoretically possible to provide a corresponding structure in other than an elastomeric material, we know of no way of doing so. We have discovered that it is only in those elastomeric materials which meet the specified properties, that the defined structure will provide the intended function with acceptable results; among such elastomeric materials now known are polyurethanes such as commercially available Adiprene from Uniroyal Chemical Corp., a segmented copolyester such as Hytrel 5556 from DuPont, and a block copolymer of nylon such as Nyrim from Monsanto Chemical Co.

In the best mode of the invention, the elastomer from which the annular resilient body of the NPT is formed has the following specific characteristics: Shore D hardness from about 40 to 65 (ASTM-D224), more preferably from about 45 to 55; a compression modulus (at 0.5 shape factor and 10% compression) in the range from about 3000 psi to about 20,000 psi, more preferably from about 5000 psi to 10,000 psi, which must not vary ±20% over the temperature range from 20° C. to 70° C. (ASTM-D695); a compression set of less than 60% (ASTM-D395B); a hysterisis (tan $\delta$) of less than 0.25 measured at 70° C. with a Rheometrics machine (ASTM-D2236), more preferably from about 0.05 to 0.15; and flex fatigue of more than 10,000 cycles at a maximum strain of 20% under normal operating conditions ('Texus' flex test, ASTM-D3629-78)). Such materials are polyurethane, segmented copolyesters believed to be prepared by ester interchange of dimethyl terephthalate and isophthalate with polytetramethyleneether glycol and excess 1,4-butanediol, and block copolymers of nylon with rubber.

The outer hoop may typically be provided with a rubber tread on the hoop's outer surface. The inner hoop is coaxial and coextensive with the outer hoop, that is, each has the same length (measured in the axial direction). The hoops are circular bands, much wider (that is, longer, in the axial direction) than they are thick (measured in the radial direction). The inner surface of the inner hoop is securely mounted on the rim of a wheel, so that the NPT with a tread may be used much the same way as a conventional pneumatic tire. Most preferably, the inner hoop is bonded to the rim, either by the adhesive strength of the polyurethane, or with an additional adhesive, so that mechanical fastening of the NPT to the rim is avoided.

The outer hoop is spaced apart from the inner hoop by a plurality of circumferentially spaced-apart planar ribs and a single central planar web, all of which are formed as a unitary construction. The single web connects the inner and outer hoops at their inner ends that is, along the circumferential centerline of the NPT, so that, if there were no ribs, the shape would be that of an I beam formed into a circle.

The ribs extend as front and rear sets of ribs, on either side of the single web, the front set angled in the range from about 15° to 75° to the radial planes which intersect the ribs in one direction, the rear set angled in the same range but in the opposite direction.

The unitary structure of the NPT is configured so that the web and rib members provide a load-carrying structure with continuous deformation due to compression of the NPT as it rotates during operation. The thickness of the web, the ribs and the hoops are such that there is essentially no detectable expansion of the tire during operation; but in addition to deformation without buckling, due to compression during normal operation, the NPT is configured to allow the ribs to buckle, either individually or severally, when the NPT runs over a sudden projection in the road's surface. The word "buckle" as used herein is defined as a relatively sudden and radical deformation as a result of compression loading that exceeds a certain critical load value (hereinafter referred to as $P_{cr}$).

Referring to the prior art Cosmos expansible sleeve holder schematically illustrated in FIG. 1, indicated generally by reference numeral 10, there is shown an annular body 16 of vulcanized rubber, the only material specified by Cosmos, mounted on a flanged steel wheel rim 12 provided with through-passages 13 for mounting on a shaft to be rotated about the axis 14. Inner hoop 22 is secured by its inner surface to outer surface 24 of the rim 12. Outer hoop 18 of the annular body is spaced apart a distance D from the inner hoop by a thin, membranous web 32 and angulated planar ribs 26, each of which ribs extends axially between hoops 18 and 22 for their axial lengths (measured along the axial direction).

The angulation of the ribs, angle A, is between 15° and 75°, with respect to the radial plane R, all the ribs being angulated in the same direction. The ribs 26 have a thickness $d_s$ measured in a direction perpendicular to its length (measured along the axis), and an end-to-end length L in the angular direction. The ribs and hoops are connected by a web 32 formed at the parting line of molds in which the wheel is molded, and therefore is positioned midway between the axial ends of the inner and outer hoops. Since the web 32 is formed as "flash" at the parting line of the mold, the web is a thin extensible rubber membrane, and because the ribs are angulated unidirectionally, the diameter of the wheel, and its outer radius $r_o$, expands upon rotation, through the inner radius $r_i$ of the annular body does not, because it is secured to the wheel rim. Since the material of the annular body is vulcanized rubber and the ribs 26 are angulated in a common direction, the wheel has essentially no ability to carry a load supported on an axle to which the wheel rim 12 is bolted. However, it is particularly well-adapted to support and hold on its cylindrical outer surface the abrasive sleeve or belt 21 which will not slide off because of the centrifugal force generated when the wheel is rotated at high speeds. The hoop spacing, that is, the distance between the inside surface of the outer hoop 18 and the outside surface of the inner hoop 22 is D. To provide a flat cylindrical surface wide enough to support the belt uniformly when the wheel expands, the outer surface 19 of the outer hoop 18 is concave when the wheel is at rest, though this dished surface is not shown.

Figure 2:
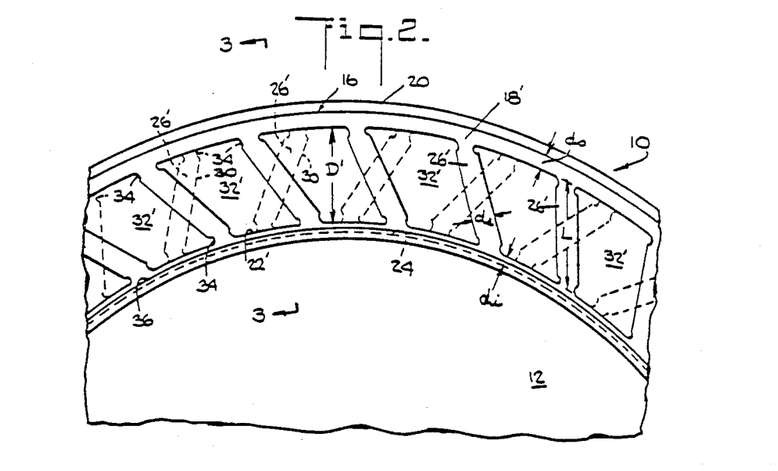
FIG. 2 is a fragmentary elevation view of a portion of the annular body of the non-expansible NPT of this invention mounted on a wheel rim, showing oppositely directed planar ribs formed integrally with a central planar web member and inner and outer cylindrical members ("hoops"), which in combination coact as a unit construction to function as the NPT.

Referring to FIG. 2 there is shown an elevational view, with portions broken away, of a wheel indicated generally by 10', including the NPT 16' of this invention molded from polyurethane and mounted on wheel rim 12. In addition to planar first ribs 26' (referred to as a front set) are additional second ribs 30 which constitute a rear set, so referred to because the front and rear sets of ribs are integrally connected by the web 32' having a thickness $d_w$, which web also connects the outer and inner hoops 18' and 22' as in FIG. 1. The term "integral" refers to the NPT being formed as a whole, and the term "unitary" describes the interaction of the component structural elements as a unit. The terms together emphasize the molding or casting of the inner and outer hoops, the web and the ribs as a single construction using the elastomer, and the coaction of these structural elements of the NPT to discharge its stated functions. The hoop spacing is D'.

The ribs 30 (shown in phantom outline) are of equal length L and oppositely directed to ribs 26, but at the same angle, for convenience in the molding of the NPT, though both the lengths L and the angulation of the ribs may be different as long as they are oppositely directed. When oppositely directed, it is preferred that a front rib 26' cross at least one rear rib 30, resulting in a "crossed" rib structure for optimum stiffness and load-carrying ability. The ribs 26' having a thickness $d_s$ measured in a direction perpendicular to its length (measured along the axis), and an end-to-end length L in the angular direction, are preferably undercut at 34, as shown, where their ends meet the inner and outer hoops 22 and 18 respectively, to enhance flexibility of the connection, thus facilitating compression of the ribs 26' and 30 without bending as each portion of the circumference of the NPT contacts the ground while the vehicle on which the NPT is mounted travels over the ground.

Figure 3:
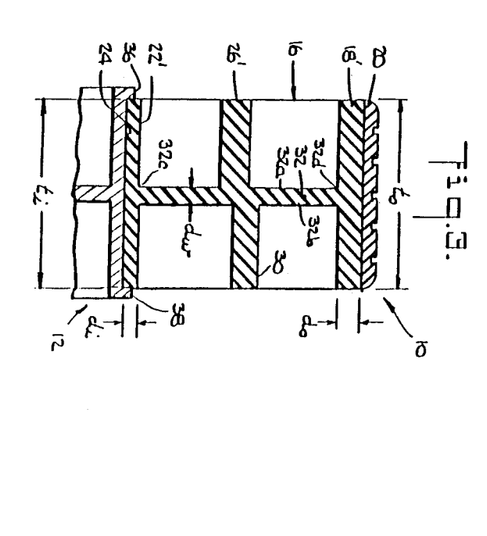
FIG. 3 is a sectional elevation view taken along the line 3—3 of FIG. 2, showing the central web member integral with the ribs which run on either side, and join the inner and outer hoops below and above.

Referring now to FIG. 3, the web 32' is positioned midway between the axial ends of the inner and outer hoops 18' an 22', and connected at its (the web's) inner periphery 32c to the inner hoop 22, and at its outer periphery 32d to outer hoop 18, so that the edge of rib 26' lies along one side face 32a of the web. All the first ribs 26' (front set) are similarly connected, so that all ribs are angled at angle A in the same direction. In an analogous manner, all the second ribs 30 (rear set) are connected at their corresponding inner and outer ends to the inner and outer hoops and their edges lie along the face 32b of the web, so that all the ribs 26' and 30 are angled at substantially equal angles A, but the first ribs are directed oppositely to the second ribs.

When the NPT is to be used as a spare tire for an automobile or truck, the NPT is provided with a rubber tread 20 secured to the outer circumferential surface of the outer hoop 18. The stiffening function of the web 32 in combination with the crossed ribs is more clearly evident in FIG. 3. The web tends to prevent the ribs from deforming by being bent along L, but allows compressive deformation of the NPT in the area around the point of contact with the ground. The ribs, in turn, prevent the web from buckling in the axial direction until $P_{cr}$ is reached, so that the web and crossed ribs cooperate to carry the load. Changing the angle A of the ribs effectively varies the spring rate without changing the dimensions of the structural components of the NPT, or the composition of the elastomer from which it is molded.

The ability of the NPT to be deformed yet return to its cylindrical shape essentially instantaneously under compression and sudden transitions of loading requires that the NPT withstand a maximum strain of 20% during normal operation over several thousand miles, yet buckle locally to absorb the sudden impact of a projecting object, or road surface irregularity. It is this unexpected ability derived from its unique construction from the elastomer which gives the NPT the handling and ride characteristics deemed essential in a conventional pneumatic tire.

The particular design of the essential deformability and buckling characteristics of the NPT which imbue it with the ability to mimic the ride and handling characteristics of a convention pneumatic tire, may be varied not only by changing the dimensions of the ribs and web, and the dimensions and relative disposition of the ribs, but also by varying the radius of the undercuts 34 which preferably range from 0.125" to 0.5" on the acute angle junctions of the ribs with the inner and outer hoops; and, from 0.25" to 1" on the obtuse angle junctions of the ribs with the inner and outer hoops. It is most preferred to undercut only one end of each rib only in the acute angles where that rib joins the inner hoop and outer hoops, though in the FIGS. the ribs are illustrated with undercuts also in the obtuse angles.

An annular body of an NPT for an automobile spare tire is formed with dimensions, dimensional relationships, and angular relationships which fall within the preferred ranges set forth in the following Table.

TABLE

| Item | Preferred range |
| --- | --- |
| $r_o$ | 4" to 18" |
| A | 20° to 60° |
| $d_i, d_o$ | 0.0312" to 0.5" |
| D | 1" to 4" |
| $r_o/D$ | 3/1 to 8/1 |
| $D/d_w$ | 11/1 to 4/1 |
| L (value of L depends on the values chosen for A and D) | |
| $L/d_s$ | 4/1 to 10/1 |
| $t_i, t_o$ | 1.5" to 5" |
| $r_i$ | 2" to 16" |

Figure 6:
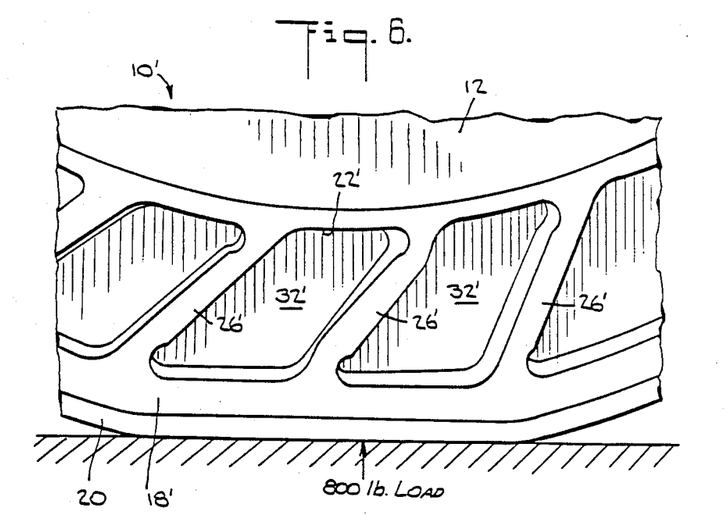
FIG. 6 is a side elevation view with portions broken away, schematically illustrating a stop-action of the ground-contacting portion of the NPT in normal use on an automobile travelling on a relatively smooth road surface.

Referring now to FIG. 6, a portion of the NPT is shown as it undergoes normal compressive deformation during operation of a vehicle over a smooth road surface. The loading force on the NPT is approximately 800 lb (363 kg). The ribs 26' and the crossed rib 30 immediately behind rib 26' most directly support the major portion of the load, and are under sufficient compression to decrease the overall lengths of the ribs. In a typical instance, the unloaded ribs are each 2.12" (5.83 cm) long, while the loaded ribs are 1.99" (5.05 cm) long.

While the ribs 26' and 30 are compressed in the ground-contact area during operation, the web 32' connecting the ribs in this area is subjected to both compression and shear forces, and might even be subjected to tensile forces. The web 32' and ribs 26' and 30 thus interact to distribute the loading forces.

Figure 7:
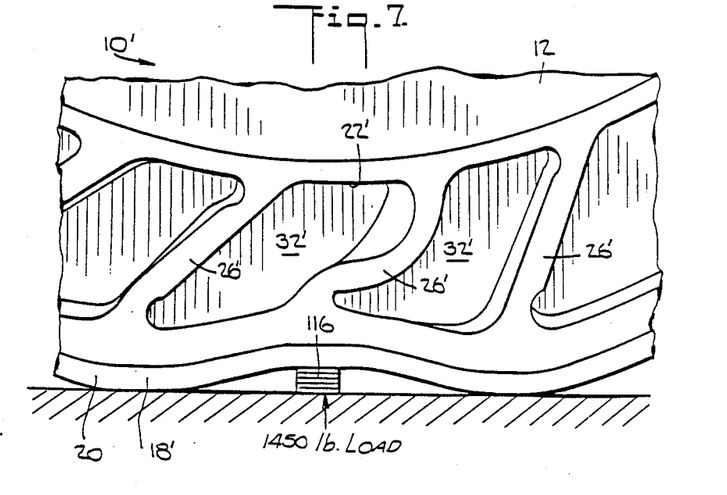
FIG. 7 is a side elevation view with portions broken away, schematically illustrating another stop-action of the ground-contacting portion of the NPT as it runs over an object lying above the road surface.

Referring now to FIG. 7, the NPT 10' is shown at the instant it rides over a sudden surface irregularity projecting above the ground when the NPT carries a load of 1450 lb force (658 kg). The rib 26' which most directly supports the load has been loaded beyond its critical load value $P_{cr}$ and has buckled, as is clearly evident because the rib has bent, that is, deflected from its length in the generally radial direction. While one rib 26' has buckled, an adjacent rib will carry an increased load without buckling if it has not been loaded to $P_{cr}$. This distinguishing characteristic, referred to as local buckling, permits the outer hoop to absorb the impact from a sudden projection and react in a manner surprisingly similar to that in which a pneumatic tire would react.

The NPT will most closely approximate the ride characteristics of a pneumatic tire if the ribs are constructed to reach $P_{cr}$ when the load exceeds the total load which then causes the NPT to undergo a deflection which is between 6% and 12% of tire section height ($SH = r_0 - r_i$). This means that when the tire undergoes a load that causes D to compress beyond 6% of the original D, then the tire reaches $P_{cr}$ and buckles. This may be expressed as follows:

$$0.06 < \frac{P_{cr}/K}{SH} < 0.12$$

wherein
0.06 = 6% deflection
0.12 = 12% deflection
$P_{cr}$ = critical buckling load
K = spring rate of NPT, and
SH = section height.

The NPT weighs less, and can be stored in a smaller space than a conventional inflated pneumatic spare tire. The space and weight objectives for a compact spare tire are best met if the total material volume (space occupied by the material of the NPT) divided by total projected volume (space between the outer surface of the outer hoop and the inner surface of the inner hoop) is between 20% and 60%.

Another desirable characteristic of any tire is an overall spring rate which changes depending upon the type of surface against which the tire is loaded. Specifically, it is desirable that the spring rate be lower over a bump or cleat 116, than over a flat surface. In the NPT the desirable ratio of spring rate over a flat surface divided by spring rate over a 0.5" (1.27 cm) wide (high) cleat is between 1.4 and 4.0.

The annular body 16' may be adhered to the surface 24 of wheel rim 12 by being molded directly thereto in a liquid molding process, with the outer surface 24 having been prepared in a known manner to receive and secure the elastomer used. Preferably the wheel rim 12 is provided with flanges 36 and 38 which cooperate with the mold to form the annular body 1' on surface 24.

Figures 4, 5:
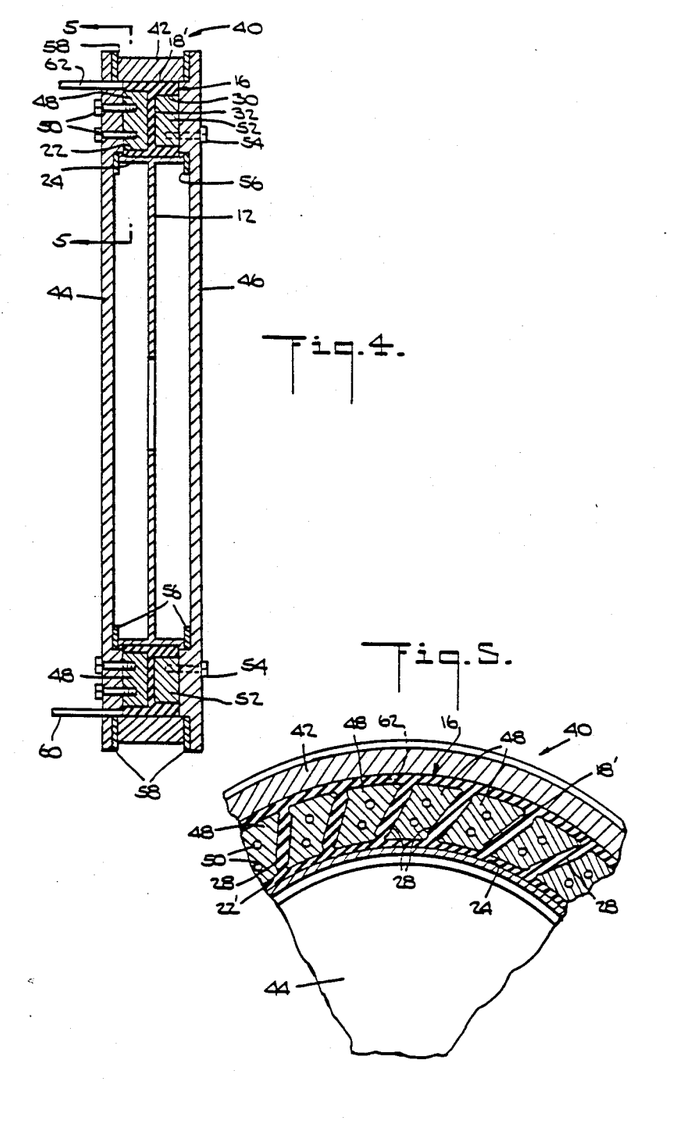
FIG. 4 is a sectional elevation view taken along the diameter of a NPT, showing the central rim and tire assembly as the NPT is molded to the circumferential surface of the rim.
FIG. 5 is a sectional elevation view taken along the line 5—5 of FIG. 4, showing inserts mounted in the mold assembly to form the ribs.

Referring now to FIGS. 4 and 5, there is shown a mold 40 for molding a polyurethane NPT which mold comprises an outer mold ring 42, which defines the outside diameter of the NPT, and two mold plates 44, 46 which define the side edges of the annular body 16'. Mold plate 44 is provided with a plurality of inserts 48 which are releasably fastened to the mold plate 44 by means of bolts 50. The inserts 48 are generally rhomboidally shaped and circumferentially spaced apart from one another so as to form the front set of ribs 26.

In an analogous manner, mold plate 46 is provided with a plurality of inserts 52 which are bolted to the mold plate with bolts 54, the inserts 52 being generally rhomboidally shaped and circumferentially spaced apart from one another so as to form the rear set of ribs 30. The inside diameter of the annular body 16' is determined by the outer surface 24 of the wheel rim 12.

Suitable pairs of inner, annular flat washers 56 and outer, annular flat washers 58 are employed to space mold plates 44 and 46 from the radial flanges of the wheel rim 12, in the case of inner washers 56, and to space mold plates 44 and 46 from the outer mold ring 42, in the case of outer washers 58. The axial thicknesses of the washers 56 and 58 determine the axial thickness of the web member 32 and these may be varied depending on design conditions specified for the annular body 16'.

Similarly, the inserts 48 on mold plate 44 and the inserts 52 on mold plate 46 may be removed and replaced by corresponding inserts of different configuration when it is desired to change either the angular orientation or the thickness of the ribs 26' and 30, in accordance with desired design changes. An inlet spout 60 is provided for supplying liquid material to the mold from a source (not shown) during the mold filling operation, and an outlet vent line 62 is provided to allow air to be removed from the mold during the filling operation.

An alternative method of making the annular body 16' would employ, in place of the wheel rim 12, an inner mold ring (not shown) similar in configuration to outer mold ring 42 but of lesser, appropriate diameter. After the annular body 16' has been molded and post-cured in this method, the annular body 16' would be adhesively secured to a machined metal ring using a polyurethane adhesive.

The following illustrative example 1 provides details of a molded polyurethane NPT.

EXAMPLE 1

A. Molding the annular body of the NPT, then adhesively securing it to a wheel rim, and adhesively securing a tread to the outer surface of the NPT:

A NPT was molded in a mold similar to that shown in FIGS. 4 and 5, but having an inner mold ring instead of the wheel rim 12, as described hereinabove. The resulting mold is filled with a reaction mixture of (a) toluenediisocyanate-poly(tetramethyleneether glycol (M.W. about 2000) (TDI-PTMEG) prepolymer having a NCO number of 5.45 and an amine equivalent of 767, and, (b) a methylenedianiline-NaCl complex (MDA-NaCl) curative (50% by weight in dioctylphthalate), the (a/b) weight ratio being 1/0.27. Prior to mixing the foregoing components, the TDI-PTMEG is heated to 65° C. and the MDA-NaCl is heated to 27° C. The mold is also heated to 65° prior to introducing the reaction mixture.

The liquid reaction mixture is poured into the mold under about 450 kPa pressure with care being taken to ensure that all the air in the mold is displaced by the liquid.

Once the mold is filled is is placed for about 1 hr in an oven (set for 121° C.) to cure the polyurethane. Subsequently, the mold is opened and the annular body removed and post-cured for about 16 hr at 70° C. The NPT formed has ribs which are undercut in the acute angle at the inner hoop, and in the corresponding obtuse angle on the other side of the rib where it meets the outer hoop.

A rubber tire tread having a thickness of about 0.6 cm is then adhered to the outer surface of the outer hoop 18' using a methyl 2-cyanoacrylate adhesive and the resulting tire is fitted and adhered to a steel rim 12 using a polyurethane adhesive cured with an organic isocyanate curative. The resulting tire and wheel assembly was used to replace a conventional passenger car tire and wheel assembly. A car equipped with this tire and wheel assembly was driven at speed up to 40 mph (64 km/hr) without deleteriously affecting control of the car and without damage to the NPT.

The NPT has the following dimensions:

| | |
|---|---|
| $r_o$ | 10.5″ (26.04 cm) |
| A | 45° |
| $d_i, d_o$ | 0.2″ (0.51 cm), each |
| D | 1.85″ (4.570 cm) |
| $r_o/D$ | 5.5 |
| $D/d_w$ | 8.2 |
| L | 2.25″ (5.72 cm) |
| $L/d_s$ | 6.4 |
| $t_i, t_o$ | 2.4″ (6.1 cm), each |
| $r_i$ | 8.05″ (20.45 cm) |

Figures 8, 10:
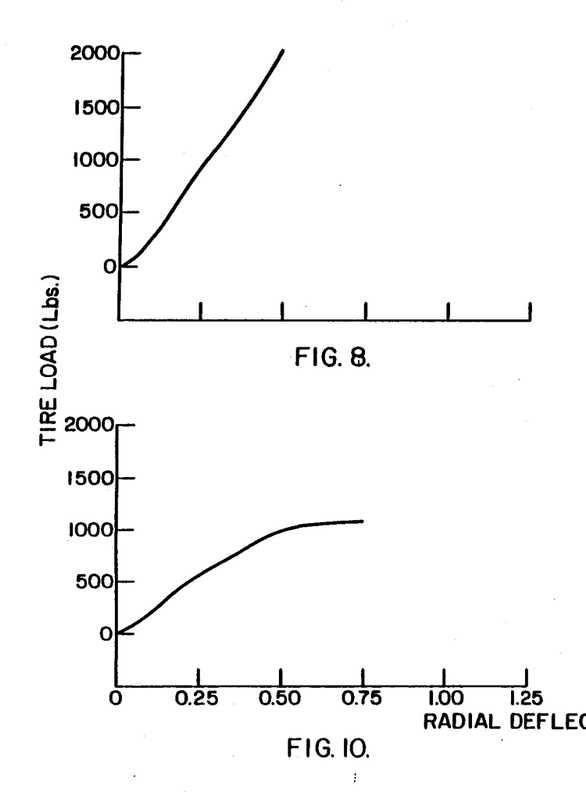
FIG. 8 is a strip chart showing the deflection of a polyurethane NPT having the structure shown in FIG. 2 et seq., namely first and second sets of ribs angulated at 45°, but in opposite directions, as the NPT is statically loaded until the load reaches 2000 lb.
FIG. 10 is a strip chart showing the deflection of a webless wheel molded from the same polyurethane cured under the same conditions, the wheel having first and second sets of ribs angulated at 45°, but in opposite directions, as the NPT is statically loaded until the load reaches 1200 lb.

The wheel is mounted on a smooth steel platform of a Tinius-Olsen machine and statically loaded until the load is 1200 lb. The strip chart for loading this sectionally assembled wheel is essentially the same and shows substantially the same deflection as that for the integrally molded wheel, molded as described below in 1B, which strip chart for 1B is reproduced in FIG. 8, and described herebelow.

B. Integrally molding the foregoing wheel assembly:

The procedure for liquid casting an NPT described in 1A hereinabove is used to liquid cast an integral assembly of an NPT with a rubber tread directly secured to a wheel rim. This is done by using a mold illustrated in FIGS. 4 and 5, modified only to the extent that the dimensions are changed as indicated by the dimensions listed herebelow for the NPT formed, and, the wheel rim and rubber tread are positioned in the mold in such a way that when sufficient polyurethane is flowed into the mold cavity to fill the annular zone between the tread and the wheel rim, and the polyurethane cured, the NPT is securely directly bonded to the outer surface of the wheel rim and the inner surface of the tread. The same polyurethane reaction mixture is used except that the polyurethane has a molecular weight of about 1500 and an NCO content in the range from about 5.6% to about 7%. The polyurethane is cured at a temperature in the range from about 150° F. to about 240° F. using a suitable crosslinking agent such as methylene-bis-ortho-chloroaniline (MBOCA). The cured NPT has the following dimensions:

| | |
|---|---|
| $r_o$ | 10.5″ (26.04 cm) |
| A | 45° |
| $d_i, d_o$ | 0.2″ (0.51 cm), and 0.14″ (0.356 cm) |
| D | 1.9″ (4.82 cm) |
| $r_o/D$ | 5.5 |
| $D/d_w$ | 9.5 |
| L | 2.2″ (5.59 cm) |
| $L/d_s$ | 8.5 |
| $t_i, t_o$ | 2.68″ (6.81 cm) |
| $r_i$ | 8.05″ (20.45 cm) |

The wheel is mounted for static loading on the Tinius-Olsen as before, and statically loaded until the load is 1200 lb. The strip chart for loading the wheel is reproduced in FIG. 8, and, as is evident, the deflection is 0.310″ at 1200 lb.

EXAMPLE 2

A. Molding a Cosmos wheel from the same polyurethane:

In a manner analogous to that described hereinabove, in 1B an annular body is molded with the same reaction mixture under identical conditions in another mold in which the inserts are so arranged as produce all ribs angulated at 45° in the same direction, and, so that no web is formed between the inner and outer hoops. This Cosmos construction permits expansion of the diameter of the body under centrifugal force, as was the stated purpose of the Cosmos wheel. The inner and outer hoops, and the ribs have the same dimensions, and particularly the same thicknesses, and all the ribs, undercut only in the acute angles as described, except that the widths of the inner and outer hoops is reduced by the thickness of the web which is absent. Thus, a Cosmos wheel is integrally formed formed from the same polyurethane, without a web (except for a membranous flash less than 1 mil thick), but with a tread (in lieu of an abrasive sleeve), all ribs having substantially the same thickness and angular direction, and enhanced flexibility to provide the desired expansion.

Figure 9:
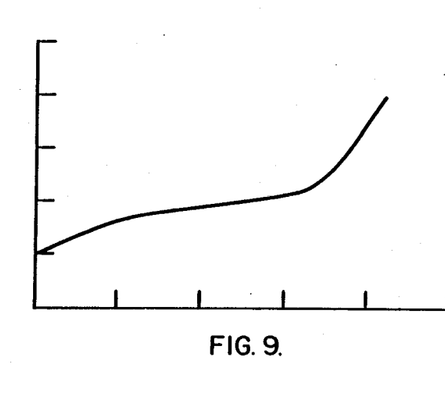
FIG. 9 is a strip chart showing the deflection of a Cosmos wheel molded, from the same polyurethane cured under the same conditions, and having only a membranous web; all ribs are angulated at 45° in the same direction, and the wheel is statically loaded until the load reaches 1500 lb.

The rubber-treaded polyurethane Cosmos wheel is loaded with 1200 lb using a Tinius-Olsen machine. The strip chart is reproduced in FIG. 9. The deflection at 1200 lb is 1.075″ indicating that ribs supporting the major portion of the load in the area near the point of contact with the surface on which the wheel rests, are unable to support the load and have collapsed, one rib overlying and compressed in contact against the next adjacent rib. The inner hoop is forced against the outer hoop separated only by the collapsed ribs.

B. Molding a wheel with no web and ribs oppositely directed, from the same polyurethane:

In a manner analogous to that described hereinabove, in 2A an annular body is molded with the same reaction mixture under identical conditions in another mold in which the inserts are so arranged in face-to-face abutment as produce a first set of ribs angulated at 45° in one direction, and, a second set of ribs angulated in the opposite direction at the same 45°, so that no web (except for the membranous web between the abutting faces) is formed between the inner and outer hoops. The inner and outer hoops, and the ribs have the same dimensions, and particularly the same thicknesses, and all the ribs are undercut only in the acute angles as described, except that the widths of the inner and outer hoops is reduced by the thickness of the web which is absent.

The inserts are machined aluminum and their abutting faces are especially polished with a 32 microfinish (about ±0.0005") to minimize "flash". Despite the fact that the reaction mixture is a liquid and the mold is closed with great force exerted by plural clamping bolts spaced apart along the periphery of the mold, there is still enough seepage of the liquid reaction mixture into the parting plane to form, upon completion of the cure, the membranous web which has no structural function, analogous to that formed in the Cosmos wheel.

This webless construction of oppositely directed ribs tends to negate expansion of the diameter of the body under centrifugal force, contrary to the stated purpose of the Cosmos wheel.

The rubber-treaded polyurethane webless wheel with oppositely directed angulated ribs, is loaded with 1200 lb using a Tinius-Olsen machine. The strip chart is reproduced in FIG. 10. The deflection at 1000 lb is 0.5", and at 1200 lb is 0.9" indicating that ribs supporting the major portion of the load in the area near the point of contact with the surface on which the wheel rests, are able to support a relatively light load, but are unable to support 1200 lb as they have almost totally collapsed.

EXAMPLE 3

Molding a modified Cosmos wheel having a central web:

In a manner analogous to that described hereinabove in 2B, a NPT is molded in another mold so that the NPT has a central planar web connecting ribs angulated at 45° in the same direction, on either side of the web, from the same reaction mixture used in Example 1B hereinabove, under identical conditions, so that the inner and outer hoops, the web and the ribs have the same dimensions as those for the NPT molded in Example 1B, and particularly the same thicknesses. The essential difference between this integrally cast embodiment and the similarly cast embodiment of Example 1B, is that all the ribs are angulated in the same direction. Thus, a modified Cosmos wheel is formed, modified to provide a treaded NPT with a web having substantially the same thickness as that of a rib, from the same polyurethane used in the prior examples 1B et seq.

Figure 11:
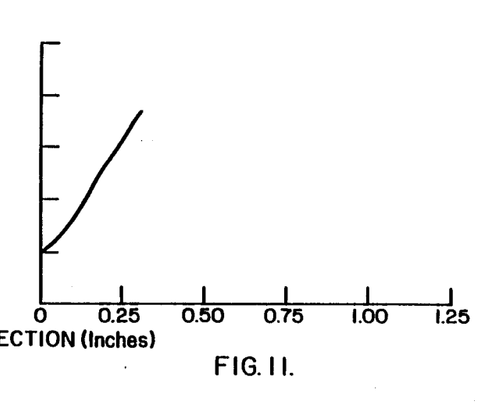
FIG. 11 is a strip chart showing the deflection of modified Cosmos wheel, molded with a central planar web having the same thickness as the ribs, from the same polyurethane cured under the same conditions; all ribs are angulated at 45° in the same direction, and the wheel is statically loaded until the load reaches 1300 lb.

This modified Cosmos wheel is statically loaded with 1200 lb using a Tinius-Olsen machine. The strip chart, reproduced in FIG. 11, shows a deflection of 0.275" at 1200 lb indicating excellent support by the ribs supporting the major portion of the load in the area near the point of contact with the surface on which the wheel rests. But the deformation of the wheel has a distinct characteristic, namely, the area at the point of contact, viewed in side elevation, appears as an undulating line; and the resulting characteristic is a bumpy ride. The unidirectionally angulated ribs in combination with the central web do not permit the same characteristic compressive deformation as that for the wheel of 1B in which the area at the point of contact, viewed in side elevation, appears as a straight line.

Though the static load-bearing ability of this webbed Cosmos wheel is excellent, the force vectors in effect while this wheel is in operation, operate only in one rotational direction, which makes the wheel unidirectional (usable only in that one rotational direction). As a result, this modified Cosmos wheel is unfit as a load-bearing wheel in a vehicle which must be capable of operating in both the reverse and forward directions.

EXAMPLE 4

The following description refers to embodiments of the Cosmos wheel molded from natural rubber which is vulcanized in a mold constructed exactly as described in his '775 specification except that the central rubber layer (identified by reference numeral 14 in Cosmos) between the steel discs (12), and the hub portion (17), were not formed, since the essential comparison between the Cosmos structure and the NPT relates to the annular body portion (15). The following modifications of the Cosmos wheel were made in a mold in which the central hub and annular rings are substitutable. This permits varying the thickness of specific portions of the wheels which were made as described herebelow. The annular ring and the central hub of the base plate of the mold are chosen so that the upper surfaces are coplanar with the upper surface of the ring of inserts, as shown in FIG. 4 of the Cosmos '775 patent. These modifications are executed in rubber because rubber must be compression molded to maintain its physical properties, and there is nothing the Cosmos reference to suggest using a liquid, or other elastomer with greatly different physical properties.

Note the recitation in Cosmos that "During such extruding of some of the mass of rubber into the rim cavities and the hub cavities, the remaining unvulcanized rubber is distributed evenly between the discs at a thickness determined by the setting of the dies of the mold assembly, i.e. if a thick body of rubber is required between the discs, the dies will be set farther apart from one another than if a thinner body of rubber is required between the dies." (col 3, lines 22–29). This fails to point out that the lengths of the inserts, and the thickness of the inner and outer rings, must be increased with increased die spacing so that at all times, the mold is kept closed, to allow for sufficient pressure to mold the wheel. Thus, whatever the die spacing, the web thickness will always be a thin membrane at the parting line, because the flash cannot be avoided.

If this were not true, then the Cosmos wheels would have to be formed, and the rubber vulcanized without being under pressure, since the mold is "open", and, as one skilled in the art would know, the wheel would necessarily have unacceptably poor physical properties. In the following example 4A, a Cosmos wheel is molded as he describes the procedure, and vulcanized, under pressure.

A. In this mold, the upper plate, the central hub, annular ring, and ring of inserts are coplanar so that in the "home" position all upper metal surfaces of the base plate and the lower surfaces of the upper plate are in contact.

A disc of natural rubber sufficient to fill the mold, is placed on the central hub of the base plate, and the wheel molded with 30 ram tons compression at a temperature of about 293° F. The inner diameter of the wheel, measured diametrically across the inner surfaces of the inner hoop (15a) is 3.4", the outer diameter of the wheel, measured diametrically across the outer surfaces of the outer hoop (15b) is 5.45"; all the ribs are angled in the same direction at 45° (same as angle A in the NPT); the ribs are 0.125" thick and 0.7" end-to-end.

A thin web of "flash" is formed at the parting line of the molds, which web connects all the ribs through the circumferential center line. The thickness of the web is about 0.001" (1 mil).

When compressed radially, the rib most directly supporting the load is not compressed, but is deflected linearly, because the rib bends.

B. This mold is similar to that used in 4A except that the dies are not closed completely. This leaves a circumferential gap of about 0.125" which results in a web of like thickness.

In a manner analogous to that described hereinabove in 4A, a wheel was compression molded at the same temperature, except that the dies were spaced 0.125" apart to form a web having a thickness corresponding to the die-spacing. The wheel was formed with the same dimensions as before, along with a web 0.125" thick, and the center of the wheel was filled with a rubber layer of similar thickness, and the web was extended as flashing extending about 2" beyond the outer surface of the outer body portion 15b.

It will be evident that there is no rational reason for one skilled in the art to mold a wheel under essentially no pressure (the mold being open), then to dispose of the central flash and radial flash, the while being penalized with the poor physical properties of substantially pressureless molding.

C. In a manner analogous to that described hereinabove in 4A, a wheel was compression molded at the same pressure and temperature, except the annular ring in the upper plate was replaced with a new annular ring which is 0.125" thicker, so as to form a web having a thickness of 0.125". The wheel which was molded had the same dimensions as before, along with a web 0.125" thick, and the center of the wheel was filled with a rubber layer of like thickness. There is no extension of the web, circumferentially, as flashing from the outer surface of body portion 15b because the dies were set by the outer periphery.

The characteristics of the wheel upon manual compression, radially, after the central layer of rubber is removed, is that the ribs are now supported by the web which enables them to carry some load depending upon the particular geometry of the construction and the materials from which it is formed, before the ribs collapse.

D. In a manner analogous to that described hereinabove in 4C, a wheel was compression molded at the same pressure and temperature, except that the annular ring of the upper plate was replaced with the annular ring 0.125" thick, used in 4A and 4B; and, the central hub of the upper plate was replaced with one which is 0.125" thicker so that the inner peripheries of the upper plate and the base plate are in contact. This forms a web having a thickness of 0.125". The wheel was formed with the same dimensions as before, along with a web 0.125" thick. The web was extended as peripheral flashing, extending about 1" beyond the outer surface of the outer body portion 15b. There is no central layer of rubber formed within the periphery of the inner body portion 15b because the dies were set by the inner periphery.

The characteristics of the wheel upon compression, radially, after the peripheral flashing of rubber is removed, are the same as that for wheel 4C.

E. In a manner analogous to that described hereinabove in 4A, a wheel was compression molded at the same pressure and temperature, except that the annular ring and the central hub of the upper plate were replaced with an annular ring and central hub which is 0.125" thicker to ensure that the mold would be closed at both its inner and outer periphery. A wheel was then molded and vulcanized having a 0.125" thick web. The wheel, upon rotation at 1500 rpm, is far less expansible than the webless Cosmos wheel indicating the web effectively negates the tendency of the unidirectional ribs to expand the wheel. As before, radial compression of the wheel bends the ribs without compressing them along their lengths indicating that, even if used as a unidirectional wheel on a vehicle, the ride and handling characteristics of the wheel would be quite different from that of the wheel of our invention. All commercially available Cosmos wheels are manufactured from vulcanized rubber so as to provide the requisite expansion during operation, and because formation of the membranous web at the parting line cannot always be avoided, the web is deliberately removed in an additional operation whenever possible.

From the foregoing detailed description it will now be evident that the structure of the NPT of our invention is unique in that it is deliberately designed to buckle under specified conditions to provide the characteristics essential to mimic a conventional pneumatic tire. This unique construction demands that the ribs be angulated and they be compressible, rather than bend under load. The resulting "open" structure not only provides the essential ride and handling characteristics but allows the NPT to dissipate heat during operation. The foregoing characteristics are lacking in any logical combination of the teachings of prior art references, each of which is conceptually so different that combining their teachings simply magnifies not only their conceptual differences but also the interaction of the structural elements which produce them.

Having thus provided a general discussion of the problem addressed and solved in our invention, specific illustrations of the best mode of our NPT, and a demonstrative comparison of our NPT with relevnt prior art wheels, it is to be understood that no undue restrictions are to be imposed by reason thereof except as provided by the following claims.

We claim:

1. A tire rotatable about an axis, comprising an annular body of resilient elastomeric material, said body consisting essentially of a generally cylindrical outer member at the outer periphery of said body, a generally cylindrical inner member spaced radially inward from and coaxial with said outer member, a plurality of axially extending, circumferentially spaced-apart first and second rib members connected at their corresponding inner and outer ends to said inner and outer cylindrical members, said rib members being generally inclined at substantially equal angles of about 15° to 75° to radial planes which intersect them at their inner ends, and a unitary circumferential web member having opposite side faces, said web member having its inner and outer peripheries connected respectively to said inner and outer cylindrical members, said web member being connected on one side face to said first rib members and on the other side face to said second rib members, said first rib members being inclined oppositely to said second rib members with respect to said radial planes, to form with said inner and outer cylindrical members and said web member a load-carrying structure in which locally loaded members are enabled to buckle.

2. The tire of claim 1 wherein said web member is planar, is perpendicular to the rotational axis of the tire and is positioned about half way intermediate the axial ends of said cylindrical members, and wherein each of said rib members extends axially from the opposing side faces of said web member.

3. The tire of claim 2 wherein said first and second rib members are undercut at each end of each rib at least in the acute angle where said each rib joins said inner and outer cylindrical members.

4. The tire of claim 3 wherein said outer cylindrical member has secured to its outer surface, a circumferential tread; and, said inner cylindrical member has secured to its inner circumferential surface, a wheel rim.

5. The tire of claim 4 wherein said elastomer has the following specific characteristics: Shore D hardness in the range from about 40 to 65 (ASTM-D224); a compression modulus (at 0.5 shape factor and 10% compression) in the range from about 3000 psi to about 20,000 psi, said modulus being maintained ±20% over the temperature range from 20° C. to 70° C. (ASTM-D695); a compression set of less than 60% (ASTM-D395B); a hysterisis (tan δ) measured at 70° C. with a Rheometrics machine (ASTM-D2236), in the range from about 0.05 to 0.15; and a flex fatigue of more than 10,000 cycles at a maximum strain of 20% under normal operating conditions ('Texus' flex test, ASTM-D3629-78)).

6. The tire of claim 5 wherein said tread, said annular body, and said wheel rim form an integral wheel structure.

7. The tire of claim 6 wherein said elastomer is polyurethane.

8. The tire of claim 7 wherein said polyurethane is derived from a reaction mixture of (a) toluenediisocyanate-poly(tetramethyleneether glycol (M.W. 1500 to about 2000) (TDI-PTMEG) prepolymer having a NCO number in the range from about 5 to about 7 and an amine equivalent of 767, and, (b) a curative in an amount sufficient to provide the desired cure of said prepolymer.

9. The tire of claim 8 wherein said substantially equal angles are in the range from 20° to 60°.

10. The tire of claim 9 wherein said curative is selected from the group consisting of methylenedianiline-NaCl complex (MDA-NaCl) curative (50% by weight in dioctylphthalate), and, methylene-bis-orthochloroaniline (MBOCA), the (a/b) weight ratio being in the range from 1/0.05 to about 1/0.3.

* * * * *